M. J. HEALY.
ATTACHMENT FOR GLASS DRAWING TANKS.
APPLICATION FILED NOV. 13, 1911.
1,034,448. Patented Aug. 6, 1912.
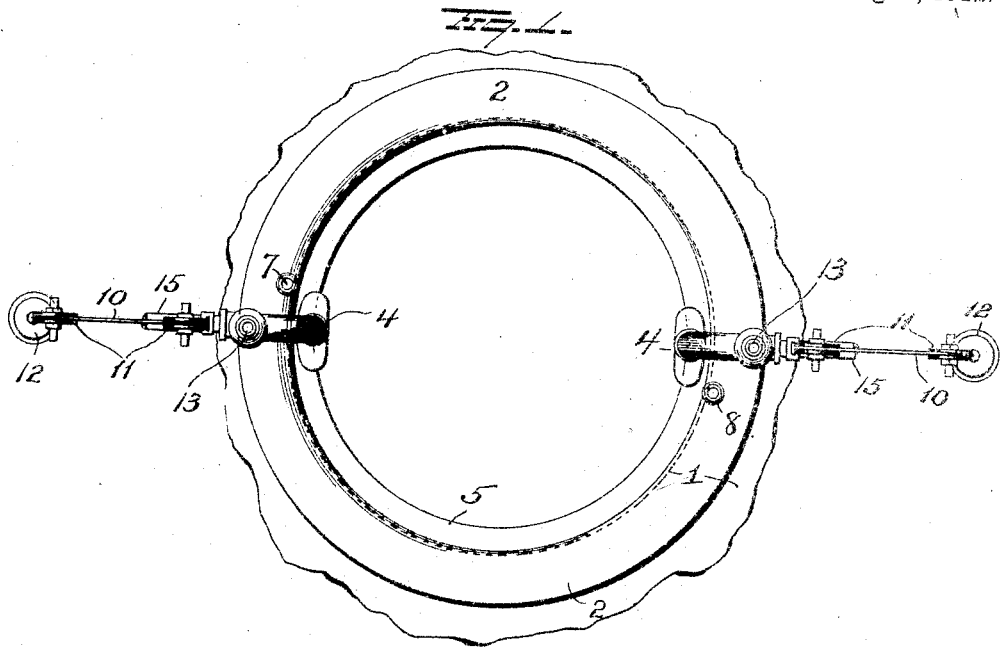
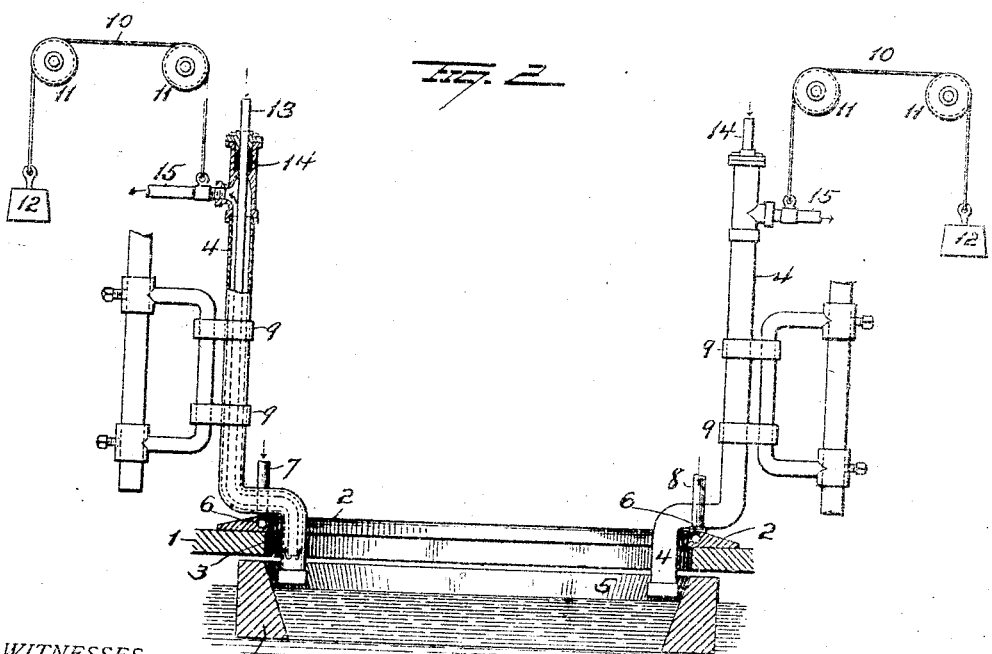

UNITED STATES PATENT OFFICE.

MACK J. HEALY, OF BRADFORD, PENNSYLVANIA.

ATTACHMENT FOR GLASS-DRAWING TANKS.

1,034,448.  Specification of Letters Patent.  Patented Aug. 6, 1912.

Application filed November 13, 1911. Serial No. 659,993.

*To all whom it may concern:*

Be it known that I, MACK J. HEALY, a citizen of the United States, residing at Bradford, in the county of McKean and State of Pennsylvania, have invented certain new and useful Improvements in Attachments for Glass-Drawing Tanks; and I do hereby declare the following to be a full, clear, and exact description of the invention, such as will enable others skilled in the art to which it appertains to make and use the same.

My invention relates to an improvement in attachments for glass drawing tanks, the object being to provide a fender for protecting the clay top stone around the drawing opening therein, and vertically movable means projecting downwardly through the fender for engagement with the floating ring for holding and centering the latter during the drawing operation, and my invention consists in the parts and combination of parts as will be more fully explained and pointed out in the claims.

In the accompanying drawings, Figure 1 is a plan view of my improvement and Fig. 2 is a view partly in section and partly in elevation.

1 represents the top stone of a glass melting tank and 2 a fender plate or ring overhanging the drawing opening 3 in the top stone. This top stone is generally and preferably made in sections shaped to form the drawing opening 3, through which the cylinders are drawn from the molten glass in the tank, and are made of refractory material which after exposure to the intense heat of the molten glass, cracks and disintegrates, and requires frequent repairs and replacement. Again, the contact of the cylinders and tools with the walls of the drawing opening 3, causes small particles of clay to break off and fall into the glass which seriously impairs the quality of the latter.

The object of the fender plate or ring 2 above referred to is to protect the exposed walls of the drawing opening 3 from contact with the tools or cylinder, and also to form a seat for the fingers 4 which guide and hold the floating rings 5 in place centrally under the drawing opening. This fender ring or plate 2 is made flat on its underside so as to rest solidly on the top stone 1, and is of less internal diameter than said opening 3, so as to overhang the latter, and thus protect the clay walls from contact with the tools and the cylinder, and also reduces the size of the drawing opening to more closely approximate the size of the cylinders to be drawn, thus dispensing with the use of movable ring shields which are employed for reducing the size of the drawing opening and also for shielding and protecting the cylinder as it is being drawn. It is provided with a water chamber 6 as shown in Fig. 2, and the said chamber is connected to an inlet pipe 7 and an outlet pipe 8, through which a continuous circulation of water may be maintained through the fender plate or ring 2, thus keeping the latter comparatively cool. This fender ring or plate may be secured in place, but this is not essential.

4 are two water cooled guiding and centering fingers, each mounted in the guides 9, and suspended by cables 10 passing over pulleys 11 and carrying a counterbalance 12. These fingers 4 are hollow and preferably made of pipe bent so as to overhang the fender ring or plate 2 and project sufficiently below the same to engage the inner wall of the floating ring 5, which, as is well known, floats on the surface of the melted glass, and in the present instance is made with a beveled inner wall, converging downwardly, so that the fingers may engage and hold the ring 5 against movement. Each finger is provided with a water supply pipe 13 passing through a packing 14 at the upper end of the finger, and terminating near the lower closed end of the finger as shown in dotted lines in Fig. 2. This supply pipe 13 is considerably smaller than the bore of the finger 4, so that the water discharged into the latter can pass up the finger at the outer side of the supply pipe and escape therefrom through the outlet 15. By this arrangement the incoming water is shielded, to a large extent, from the heat, by the outgoing water surrounding the supply pipe, so that comparatively cool water will be discharged into the finger at the lower end thereof.

After a cylinder has been drawn and severed from the glass in the tank, the fingers are raised so as to permit the floating ring 5 to be pushed into the tank so that the partly cooled glass therein will be reheated. After another ring has been moved to position under the drawing opening, the fingers are lowered and operate by their engagement with the inner face of the floating ring to center and hold same in position under the drawing opening, and also operate to hold the fender plate or ring in position concentric with the drawing opening.

By means of the fender ring or plate, I can dispense with the ring shield ordinarily used, and use a smaller drawing opening. By dispensing with the ring shield I avoid the friction and contact between the ring shield and top stone, and consequent chipping of both, and by the employment of the fender I secure a closure for the drawing opening around the cylinder that is as effective as the ring shield, and at the same time protect the top stone adjacent the drawing opening from injury due to the falling glass when a cylinder breaks and also prevents particles of clay and broken glass from falling into the tank. With the fender, when breakage occurs, such as falls into the tank will fall within the floating ring, which latter can then be pushed back into the tank for reheating or skimmed out of the ring as desired.

It is evident that many slight changes might be resorted to in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters-Patent, is:—

1. The combination with the top stone of a glass melting tank having a circular drawing opening therein, of a water cooled fender having an opening therein, the said fender resting on the tank and around the drawing opening therein, and vertically movable guide fingers adapted to be projected into the tank within the opening in the fender for holding the floating ring in position.

2. The combination with the top stone of a glass melting tank having a circular drawing opening therein, of a fender having an opening smaller than the drawing opening, the said fender resting on the tank and overhanging the drawing opening and vertically movable floating ring guiding fingers adapted to be projected into the tank within the fender opening.

3. The combination with the top stone of a glass melting tank having a drawing opening, of a water cooled fender resting on the tank and overhanging the drawing opening, and a series of water cooled floating ring guiding fingers mounted to move vertically, the lower ends of said fingers being within the plane of the circular opening in the fender ring or plate and adapted to be projected below said ring or plate.

In testimony whereof, I have signed this specification in the presence of two subscribing witnesses.

MACK J. HEALY.

Witnesses:
W. C. PURPLE,
T. P. GEOGHEGAN.